United States Patent

Anderson et al.

[11] 4,136,828
[45] Jan. 30, 1979

[54] OXIDE DEPOSITING RIBBON BURNER

[75] Inventors: Joseph W. Anderson, Corning; Donald L. Guile; Roy E. Smith, both of Horseheads, all of N.Y.

[73] Assignee: Corning Glass Works, Corning, N.Y.

[21] Appl. No.: 810,308

[22] Filed: Jun. 27, 1977

[51] Int. Cl.$^2$ .............................................. F23D 11/16
[52] U.S. Cl. .................... 239/422; 239/424.5
[58] Field of Search ................ 239/132.3, 419, 419.3, 239/422, 424.5, 425, 556, 560, 549

[56] References Cited

U.S. PATENT DOCUMENTS

| | | | |
|---|---|---|---|
| 2,005,308 | 6/1935 | Anderson | 239/132.3 X |
| 3,302,596 | 2/1967 | Zinn | 239/132.3 X |
| 3,565,345 | 2/1971 | Moltzan | 239/422 |
| 3,565,346 | 2/1971 | Carrell | 239/422 |

Primary Examiner—John J. Love
Attorney, Agent, or Firm—William J. Simmons, Jr.; Walter S. Zebrowski; Clarence R. Patty, Jr.

[57] ABSTRACT

An elongated burner for producing a stream of metal oxide soot comprises a burner face having two parallel arrays of orifices for issuing a gas-oxygen mixture to produce two intersecting linear flames. Disposed between the gas-oxygen orifices is an array of orifices for issuing metal halide vapor into the flame. Two parallel arrays of orifices, one on each side of the vapor orifices and closely spaced therewith provide high velocity jets of inner shield gas on opposite sides of the vapor streams. Disposed between the inner shield gas orifices and the gas-oxygen orifices are two elongated slots which are much greater in width than the diameters of the aforementioned orifices. These slots provide a large volume, low pressure dry, nonreactive gas which prevents the flame from "backsplashing" onto the region of the vapor orifices and further prevents the deposition of soot on the burner face.

5 Claims, 7 Drawing Figures

OXIDE DEPOSITING RIBBON BURNER

BACKGROUND OF THE INVENTION

This invention relates to a burner for the production of a metal oxide article from a volatile compound containing a constituent of the oxide. More particularly, this invention relates to a ribbon burner capable of forming a linear deposit of such an oxide.

The formation of articles such as crucibles, tubing, optical waveguides and the like by depositing metal oxides produced by the flame hydrolysis process upon substrates or mandrels is well known. This process generally involves the vapor phase hydrolysis of volatile anhydrous chlorides of metallic elements from Groups III and IV of the Periodic System, such as for example, silicon tetrachloride, germanium tetrachloride, titanium tetrachloride and aluminum trichloride. U.S. Pat. Nos. 2,272,342; 3,609,829 and 3,737,392 teach methods of making various articles by employing this process. Generally, a single burner has been employed to deposit an oxide layer upon a mandrel or substrate. To coat a planar rectangular area the single burner has been caused to sequentially scan adjacent linear paths. To cover the outside surface of a cylindrical mandrel, the mandrel has been translated and rotated with respect to the flame from the burner as taught in U.S. Pat. No. 3,609,829. This latter mentioned patent teaches a burner for depositing pure fused silica ($SiO_2$). A stream of $SiCl_4$ issues from a centrally located aperture on a flat burner face. An annular slot surrounding the central aperture provides a stream of a dry, nonreactive gas such as oxygen or air. By "nonreactive gas" is meant one which does not react with the metal halide vapor at the temperatures at which the gas and vapor emanate from their orifices. If the nonreactive gas is oxygen, for example, it will react with the vapor in the high temperature reaction region which is remote from the burner face. An annular ring of apertures concentric with both the central aperture and the annular slot provides a stream of combustible gases. Since the oxygen issuing from the annular slot does not initially react with the $SiCl_4$, the $SiCl_4$ is not decomposed immediately adjacent the burner face, thereby preventing the accumulation of deposited obstructions in or around the apertures of the burner. Such an accumulation or buildup of metal oxide on the burner face is objectionable in that it can obstruct burner orifices, thereby resulting in a nonuniform deposition. Moreover, portions of the buildup can dislodge and become deposited on the target, thereby forming inclusions in the resultant article. The gaseous silicon tetrachloride does intermix and react with the oxygen and fuel a distance from the burner face, and the resultant reaction produces pure silicon dioxide soot which deposits upon the mandrel.

For many applications it is desirable to generate a uniform soot pattern with minimal movement between the work and the soot generating system. It may be desirable, for example, to reduce striations caused by the employment of a single burner to scan the entire surface of the work. It may also be desirable to deposit a greater amount of soot per unit time than that which can be achieved by a single burner. A ribbon or strip burner appears to be the simplest soot generating system for providing large area coverage of the work.

An attempt was made to form a ribbon burner comprising a linear array of $SiCl_4$ delivery apertures, each surrounded by a narrow slot for providing that aperture with a sheath of shield oxygen, a linear array of fuel-supplying apertures being disposed on opposite sides of the array of annular slots. A burner of this type is disclosed in U.S. Pat. No. 3,565,346. Since each annular slot is formed by a tube disposed within an annular opening in the burner face, the tube cannot be secured to the burner face but must be secured only at that end thereof remote from the burner face. Since it is impossible to maintain these tubes in a parallel array, the streams of $SiO_2$ particles generated by the reaction of the $SiCl_4$ gas issuing from each of the central apertures were directed to the mandrel in a nonparallel manner so that the thickness of the deposited $SiO_2$ coating was nonuniform. Placing slotted supports within the apertures to maintain the tubes in a parallel array obstructed the flow of oxygen from the slots, thereby resulting in a buildup of $SiO_2$ on the burner face. It was noted that at low flows of inner shield oxygen, a well developed sheet-like stream of $SiO_2$ soot could be obtained. However, at such low flow rates of inner shield oxygen, a considerable amount of soot buildup occurred on the burner face between the inner shield tubes and the fuel apertures. If the inner shield flow was increased, this buildup was minimized, but the sheet-like nature of the soot stream was adversely affected. At these higher flows, the soot stream consisted of a series of closely spaced discrete streams rather than a continuous sheet.

To obtain a soot deposition of more uniform thickness the inner shield slots were replaced by two linear arrays of orifices, one on each side of the array of $SiCl_4$ vapor orifices and closely spaced with respect thereto. Two rows of gas-oxygen orifices are located outside the rows of shield gas orifices and are slightly inclined so that the flames therefrom converge a small distance from the face of the burner to establish a reaction zone. The inner shield oxygen is intended to impart a separation between the $SiCl_4$ vapor and the gas-oxygen reaction products. However, the relatively high velocity flow of oxygen from the inner shield orifices creates a low pressure area which draws a portion of the flame back toward the burner face and the vapor orifices, an occurrence referred to herein as back-splashing. There is also a backward flow of soot particles along the interior surface of the gas-oxygen flames which causes a deposition on the cool face of the burner. Variation of the inner shield oxygen flow does not improve the situation.

SUMMARY OF THE INVENTION

It is therefore an object of the present invention to provide a ribbon burner which resists the buildup of soot on the face thereof during operation.

Briefly, the present invention relates to a burner for producing a flame in which a reactant gas undergoes a chemical reaction. The burner comprises a housing having means defining a first linear array of orifices for providing a plurality of streams of the reactant gas. The housing includes means defining second and third parallel linear arrays of orifices for directing angled streams of combustible gas which intersect the streams of reactant gas. The second and third arrays are disposed on opposite sides of the first array and are equally spaced therefrom. The improvement of the present invention comprises means disposed between the first array of orifices and the second and third arrays of orifices, respectively, for providing a shield gas at a velocity less than that with which the reactant gas exits the first orifices, the total flow rate of the first shield gas being greater than that of the reactant gas.

DETAILED DESCRIPTION OF THE INVENTION

It is to be noted that the drawings are illustrative and symbolic of the invention, and there is no intention to indicate the scale or relative proportions of the elements shown therein.

Figure 1:
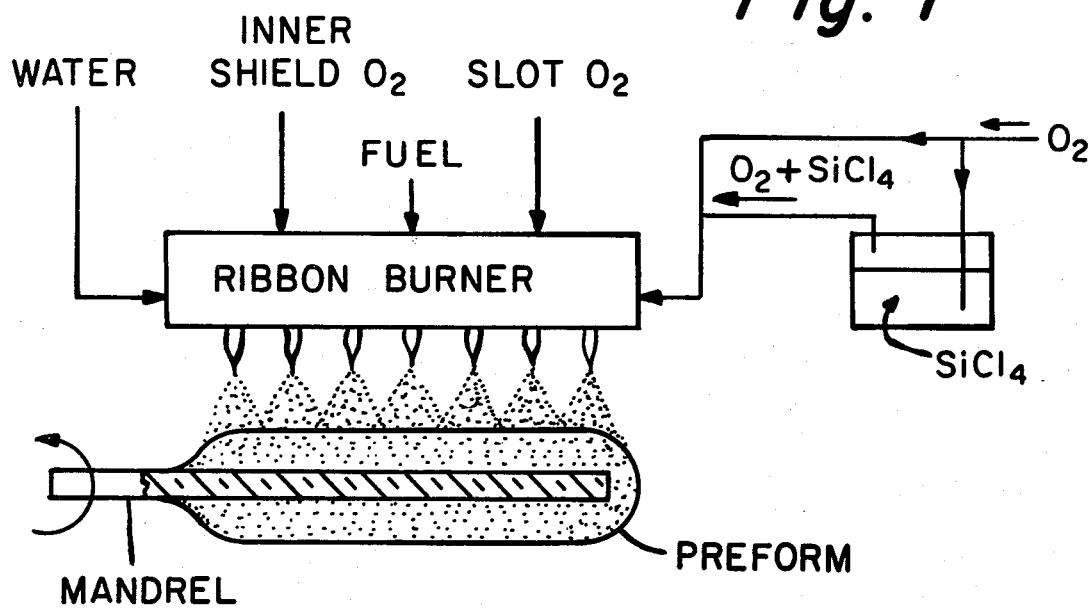
FIG. 1 is a schematic illustration of a system including a ribbon burner for forming an elongated soot preform.

FIG. 1 is a schematic diagram of a system for forming elongated soot preforms of the type which may be employed in the manufacture of optical waveguides. A stream of carrier gas, in this case oxygen, is introduced into and passes through a volatile silicon compound, in this case $SiCl_4$. The vapors of the volatile compound are entrained by the carrier gas and the mixture may be combined with additional oxygen before being conveyed to a ribbon burner wherein the vapors of the volatile compound are hydrolyzed and form silica particles in the flames of the burner.

As further illustrated in FIG. 1, a mandrel or support member, shown as a rod, is rotated as indicated by the arrow. Silica particles, sometimes referred to as soot, are deposited on the rotating mandrel to form a soot preform. After the preform has grown to a predetermined radius, it can be consolidated in a well-known manner to form a pure fused silica rod or tube. Prior to consolidation, the preform may be doped in accordance with the teachings of U.S. Pat. Nos. 3,859,073 or 3,864,113.

During the operation of the burner, a coolant such as water may be required to maintain the proper operating temperature. An inner shield gas such as oxygen may be discharged from orifices adjacent to those from which the oxygen and $SiCl_4$ is discharged to function as a barrier between the $SiCl_4$ and the products of combustion of the flame. In accordance with the present invention, a dry gas such as oxygen is supplied to a pair of slots which are disposed between the array of $SiCl_4$ vapor orifices and those orifices which supply fuel and oxygen to the flames.

Figure 2:
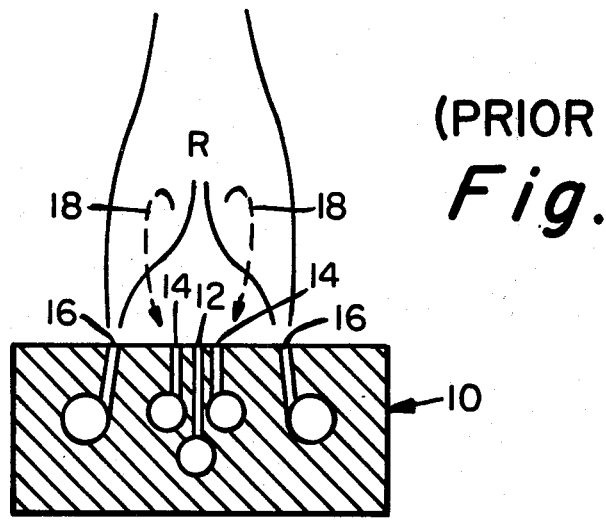
FIG. 2 is a cross-sectional view of a prior art type of burner, the operation thereof being illustrated.

For a better understanding of the problems encountered during the operation of previously employed burners, a prior art ribbon burner 10 is illustrated in FIG. 2. A linear array of orifices 12, which is centrally disposed on the face of burner 10, is provided for issuing a plurality of parallel streams of a reactant gas such as $SiCl_4$. Disposed on opposite sides of orifices 12 and equally spaced therefrom are two linear arrays of orifices 14 for issuing a dry, nonreactive inner shield gas such as oxygen or air. Streams of premixed gas and oxygen issue from linear arrays of orifices 16 which are equally spaced on opposite sides of orifices 12. Orifices 16 are slanted so that the gas-oxygen flames converge at a small distance from the face of the burner to establish a reaction zone R. The inner shield gas issuing from orifices 14 has been employed in an attempt to prevent the hydrolysis reaction from occurring at the burner face by providing a barrier between the products of combustion of the gas-oxygen flame and the $SiCl_4$ vapor issuing from orifices 12. This inner shield establishes the reaction zone R at a distance beyond the burner face and also confines the reaction and provides direction to the generated soot.

The prior art burner of FIG. 2 could not be operated cleanly because of a backward flow of soot particles from reaction zone R along the interior surface of the flame as illustrated by broken lines 18. These soot particles caused a deposit on the face of the burner which interferes with the proper flow of gas from the orifices and quickly plugs the orifices, thereby necessitating shut-down. The situation is not improved by varying the inner shield oxygen flow. Increasing the inner shield velocity appears to create a zone of lower pressure near the burner face and causes the rate of deposition of soot on the burner face to increase.

Figure 3:
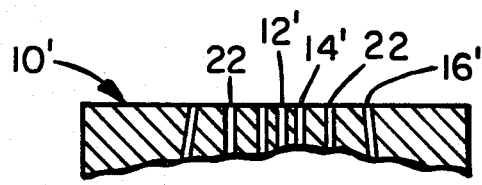
FIG. 3 is a partial, cross-sectional view of a modification of the embodiment of FIG. 2.

FIG. 3 illustrates a modification of the embodiment of FIG. 2 wherein a pair of elongated slots 22, which extend the entire length of the burner face, were added in an attempt to eliminate soot buildup on the burner face. Elements similar to those of FIG. 1 are represented by primed reference numerals. The width of slots 22, which are disposed between orifices 14' and 16', was similar to the diameters of orifices 12', 14' and 16'. It was thought that the additional curtain of dry gas adjacent to the flames would prevent the backsplash in the modified burner. However, it appeared that the sheets of high velocity gas emerging from slots 22 also created a low pressure zone which perhaps increased the tendency of soot particles to flow toward the burner face.

Figure 4:
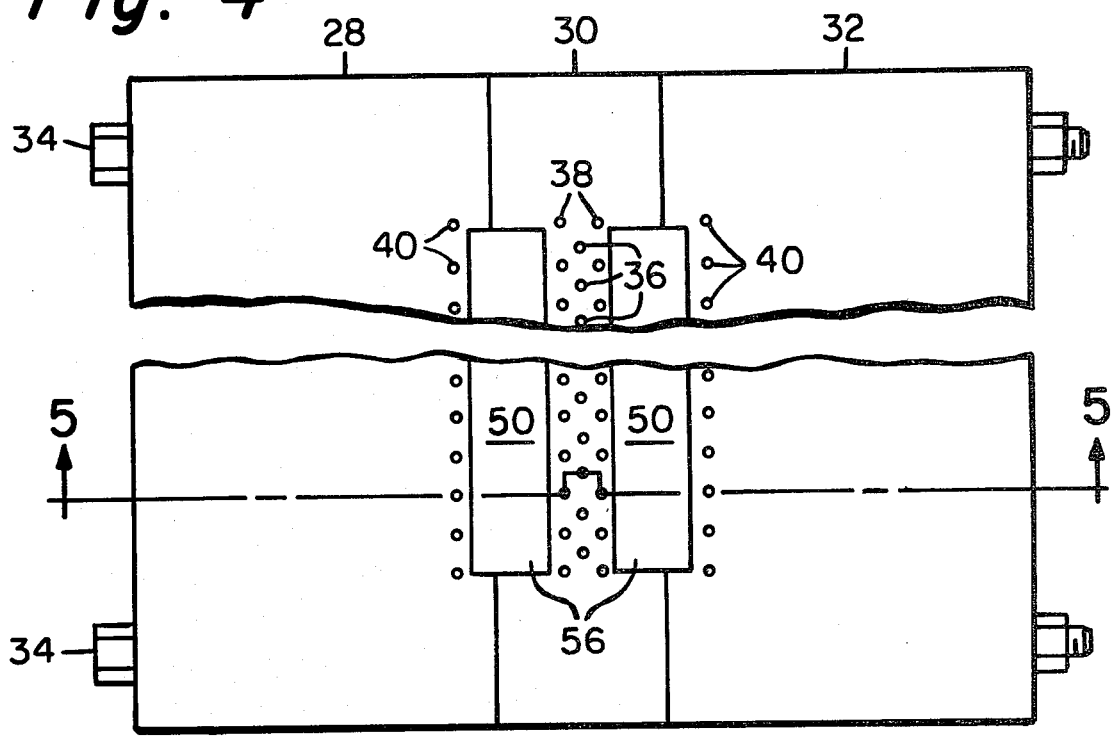
FIG. 4 is a plan view of a burner constructed in accordance with the present invention.
Figure 5:
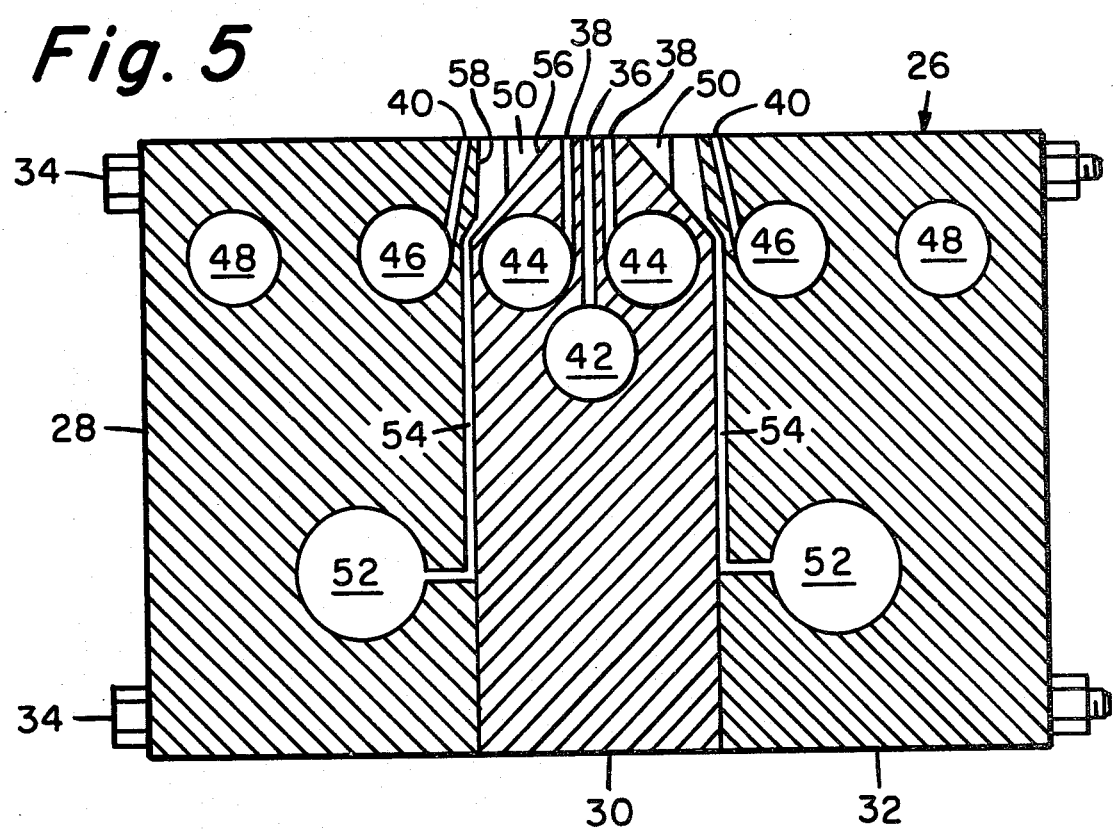
FIG. 5 is a cross-sectional view taken along lines 5—5 of FIG. 4.

A burner design which eliminated the soot buildup problems discussed hereinabove is illustrated in FIGS. 4 and 5. Burner 26 is formed from three housings 28, 30 and 32 which are secured together by bolts 34. Disposed along the surface of central housing 30 is a linear array of orifices 36 from which streams of a vapor such as $SiCl_4$ issue. The inner shield gas jets may be provided by orifices 38 which are arranged in two linear arrays on opposite sides of orifices 36. Gas-oxygen orifices 40 are disposed in two linear arrays along the surfaces of housings 28 and 32. Manifold 42 supplies vapor to orifices 36, manifolds 44 supply a dry gas such as oxygen to orifices 38, and manifolds 46 supply a combustible gas such as a mixture of fuel gas and oxygen to orifices 40. Holes 48 are provided for the passage of a coolant such as water.

In accordance with the present invention an elongated slot 50 is disposed on each side of array of orifices 36. In the event that inner shield orifices 38 are employed, a slot 50 is disposed between each array of orifices 38 and the associated array of orifices 40. The purpose of slots 50 is to direct a relatively high volume flow of dry, nonreactive gas toward each side of the array of streams of vapor issuing from orifices 36 without disturbing the gas streams issuing from the remaining burner orifices in such a manner as to cause eddy currents or low pressure regions which could result in backsplashing and soot buildup on the burner face. To perform this function the velocity of gas emanating from slots 50 must be lower than the velocity of gas emanating from any other burner orifice and is preferably less than one foot per second. The rate of flow per unit area from slot 50 should be no greater than about 0.4 SCFM per square inch. To establish the aforementioned conditions of velocity and flow of gas from slots 50 the width of each slot 50 must be at least one half the distance between arrays of orifices 36 and 40. If inner shield orifices are employed, it is preferred that the width of each slot be at least one half the distance between arrays of orifices 38 and 40.

The dry, nonreactive gas is supplied to slots 50 by manifolds 52. Distribution slots 54 which interconnect slots 50 and manifolds 52 are much narrower than slots 50 so that gas is distributed to the entire length of each slot 50 at a substantially uniform pressure. It has been found that the area of the distribution slots or similar distribution paths for interconnecting slots 50 and manifolds 52 should be at least ten times smaller than the area of slots 50 at the burner face to provide uniform pressure.

Figure 6:
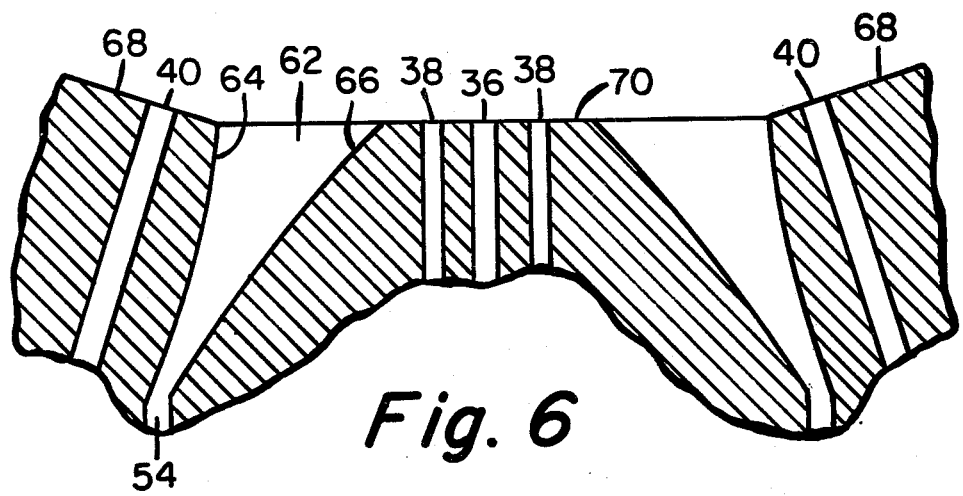
FIGS. 6 and 7 show partial, cross-sectional views of modifications of the embodiment of FIGS. 4 and 5.

Other factors such as the shape and angular orientation of the slot-forming walls are also important. It is preferred that both of the elongated slot-forming walls 56 and 58 be angled toward orifices 36 so that the gas flowing therefrom is directed toward the gas streams issuing from orifices 36. Furthermore, the gas issuing from slots 50 should be nonturbulent, and the velocity and flow rate thereof should be as uniform as possible across the width of the slot, and therefore, designs such as those illustrated in FIGS. 6 and 7 may be employed. Walls 64 and 66 which form slot 50' in FIG. 6 are curved throughout their lengths so that the width of the slot gradually increases from distribution slot 54' to the burner face. FIG. 6 also illustrates that the entire burner face need not be planar. That portion 68 of the burner face in which orifices 40 are located may be angularly disposed with respect to portion 70 of the burner face in which orifices 36 and 38 are disposed.

Figure 7:
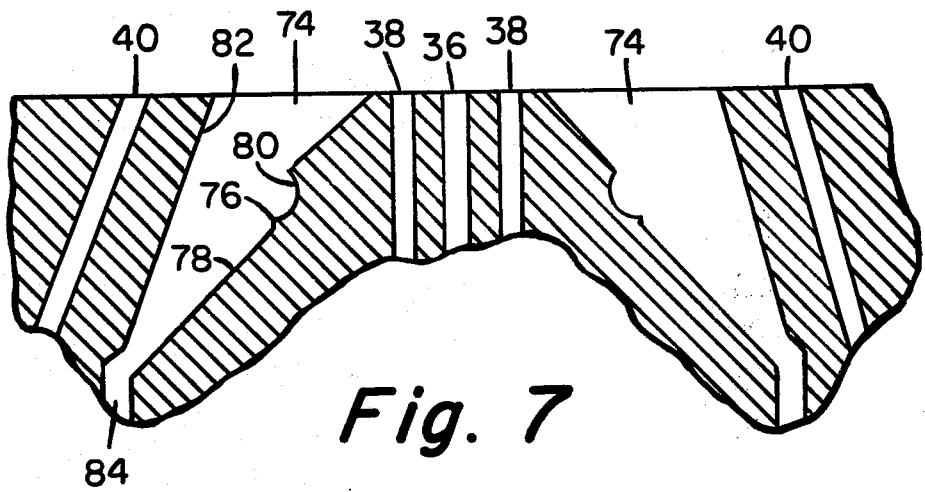

In FIG. 7, a perturbation 76, which protrudes from slot-forming wall 78, is immediately followed by a cylindrical indentation 80. The remaining slot-forming wall 82 is illustrated as being substantially planar. The combination of the protrusion and indentation causes a slight deflection of the gas stream toward the center of the slot, thereby permitting relatively non-turbulent low pressure gas to emanate from the slot.

A burner constructed in accordance with the embodiment illustrated in FIG. 7 was successfully operated without the buildup of soot on the face thereof. The arrays of orifices 36, 38 and 40 extended 4 inches. Each array of orifices 40 contained 90 orifices, arrays 38 contained 65 orifices, and array 36 contained 64 orifices. The dimensions of the slot openings of each of the slots 74 was 4 inches × 0.234 inch. The angle which wall 82 made with the face of the burner was 80°, and the remaining wall was angled toward orifices 36 to an even greater extent as shown in FIG. 7. The apertures terminating in orifices 40 were also disposed at an angle of 80° with respect to the burner face, whereas the apertures terminating in orifices 36 and 38 were perpendicular to the burner face. The total areas of the orifices and slots, the total flow rates and the velocities of the gases issuing therefrom are set forth in Table I.

TABLE I

| Source of Gas | Total Orifice Area (in.$^2$) | Total Flow (SCFM) | Velocity ft/sec |
|---|---|---|---|
| Orifices 36 ($SiCl_4 + O_2$) | 0.0201 | 0.15 | 17.9 |
| Orifices 38 ($O_2$) | 0.0414 | 0.10 | 5.8 |
| Slots 74 ($O_2$) | 1.84 | 0.55 | 0.7 |
| Orifices 40 (Gas + $O_2$) | 0.0814 | 1.50 | 44.2 |

No soot buildup or plugging occurred when this burner was operated in accordance with the conditions set forth in Table I. When soot was directed onto a rotating rod, no discontinuities were observed on the deposited soot. Whereas the flow of $SiCl_4$ was normally 0.5 lbs/hr, the flow of this compound was increased to 2 lbs/hr to test burner operation. No soot buildup occurred. It is noted that the velocity of the oxygen emerging from slots 74 was only 0.7 ft/sec whereas oxygen emerged from the inner shield orifices 38 at a velocity of 5.8 ft/sec. The low velocity of the gas emerging from slots 74 in addition to the large flow rate of the slot gas was responsible for the generation of a region of positive pressure between the $SiCl_4$ vapor and the flames causing the flames to remain separated for a sufficient distance beyond the burner face and preventing backsplashing so that reacted soot was forced away from the burner and was directed toward the target.

The burner was also operated without any flow from inner shield orifices 38, the flow of oxygen from slots 74 being 1.2 SCFM. Soot began to deposit on the burner face at a rate much lower than that at which it deposited on the prior art burners of FIGS. 2 and 3.

We claim:

1. A burner for producing a flame in which a reactant gas undergoes a chemical reaction comprising
   a housing, a portion of which defines a burner face,
   means in said housing defining a first linear array of orifices for providing a plurality of streams of said reactant gas,
   means in said housing defining second and third parallel linear arrays of orifices, for directing angled streams of combustible gas which intersect the streams of reactant gas, said second and third arrays being disposed on opposite sides of said first array and being equally spaced therefrom, and
   means disposed between said first array of orifices and said second and third arrays of orifices, respectively, for providing a first shield gas at a velocity less than that with which said reactant gas issues from said first orifices, the total flow rate of said first shield gas being greater than that of said reactant gas, said means for providing a first shield gas comprising first and second elongated rectangular slots in said burner face, one of said slots being disposed between said first linear array and each of said second and third linear arrays, the width of each of said slots being at least one half the distance between said first and second arrays.

2. A burner in accordance with claim 1 further comprising third and fourth parallel linear arrays of orifices for providing a plurality of streams of a second shield gas, said third array being disposed between said first array and said first rectangular slot, and said fourth array being disposed between said first array and said second rectangular slot.

3. A burner in accordance with claim 2 further comprising manifold means for supplying said first shield gas, and first and second distribution slots, one of said distribution slots connecting said manifold means to each rectangular slot, the cross-sectional area of each rectangular slot at said burner face being at least ten times the cross-sectional area of each of said distribution slots.

4. A burner in accordance with claim 3 wherein each of said rectangular slots comprises two elongated walls that extend the length of said arrays of orifices, both walls of each rectangular slot being angled toward said streams of reactant gas.

5. A burner in accordance with claim 4 wherein the width of each of said rectangular slots increases toward said burner face.

* * * * *